Jan. 3, 1961  L. WIEDMANN ET AL  2,966,975
ELECTRO-MAGNETIC CLUTCH
Filed Oct. 26, 1955  3 Sheets-Sheet 1

INVENTORS
LUDWIG WIEDMANN,
HERMANN K. FISCHER,
BY Parry + Jesse
ATTORNEYS.

Jan. 3, 1961 L. WIEDMANN ET AL 2,966,975
ELECTRO-MAGNETIC CLUTCH
Filed Oct. 26, 1955 3 Sheets-Sheet 2

INVENTORS
LUDWIG WEIDMANN,
HERMANN K. FISCHER,
BY
ATTORNEYS.

United States Patent Office 2,966,975
Patented Jan. 3, 1961

2,966,975

ELECTRO-MAGNETIC CLUTCH

Ludwig Wiedmann and Hermann K. Fischer, Friedrichshafen, Germany, assignors to I-T-E Circuit Breaker Company, Philadelphia, Pa., a corporation of Pennsylvania Filed Oct. 26, 1955, Ser. No. 543,172

Claims priority, application Germany June 22, 1955

12 Claims. (Cl. 192—84)

This invention relates to electro-magnetic clutches and has for an object to provide an electro-magnetic clutch of compact and simple design wherein the clutch parts have a minimum of strain and wear thereon.

It is a further object of our invention to provide a clutch having a magnetic passage component, which serves as a bearing for the solenoid magnet body which is non-rotary and has no torque transmission stress thereon.

Figure 1:
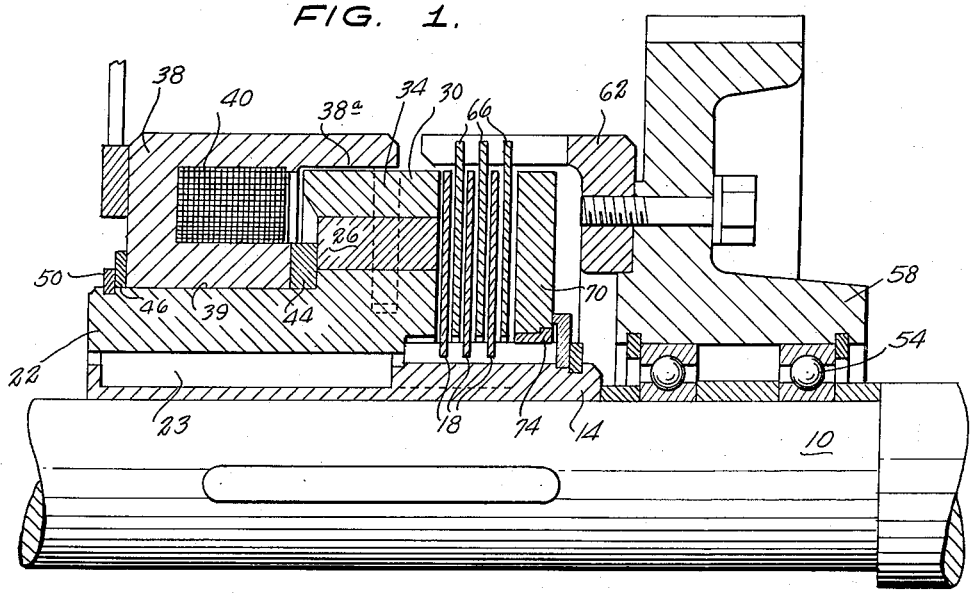

Other objects and features of our invention will be apparent from the description which now fol'ows in conjunction with the appended drawing, in which:

Fig. 1 is a partial elevation in cross-section of one form of the invention, and Figs. 2, 3, 4, and 5 are partial elevations in cross-section of other forms of the invention.

Briefly, our invention contemplates the use of a solenoid magnet mounted on a bearing of magnetic material, the solenoid being fixed and the bearing being rotative with a drive shaft. Lines of force from the solenoid pass through the bearing to attract an armature. Intermediate the armature and face of the bearing are a plurality of clutch disks in one form of the invention or positively engageable teeth in other forms. Thus, an exceedingly compact design is effected wherein the solenoid does not have any actual torque strain placed thereon but serves merely to bring together the engageable components.

Referring now to Fig. 1, the invention comprises a driving shaft 10 on which is keyed a bushing or first sleeve 14 slidably splined to which are a series of frictional disks such as 18. Mounted on the bushing 14 is a ferro-magnetic collar or second sleeve 22 keyed to the bushing 14 at 23. The collar or sleeve 22 is integrally associated with a non-magnetic collar 26 and an outer magnetic collar 30. Thus, the collars 22, 26 and 30 are rotative with the shaft 10, being held in association with each other by pins 34 of which there may be a suitable plurality angularly spaced as required. Mounted on the second sleeve 22 is a centrally bored solenoid magnet body 38 having a toroidal winding 40. The cylindrical engaging surfaces at 39 between solenoid body 38 and second sleeve 22 are smoothly machined so that the solenoid may be held fixed by any suitable means while the second sleeve 22 rotates with shaft 10. Spacer rings such as 44 and 46 may be utilized for the purpose of holding the solenoid in proper position, in conjunction with a locking ring 50. Also mounted on shaft 10 is a bearing 54 which carries a driven gear 58. Bolted to the driven gear is a flanged collar 62 to which are splined in a well-known manner the friction disks 66, intermediate the disks 18. An armature disk 70 is provided which is mounted on a non-magnetic bushing 74 that is freely slidable and rotatable on the splined portion of first sleeve 14. When the solenoid is energized lines of force are divided into concentric cylindrical arrays, because of the non-magnetic collar 26, and pass through the frictional disks 18 and 66 to attract the armature 70. Thus, the magnetic field goes through the sleeve 22, the armature 70, and the collar 30, forming two concentric fields which meet in the armature to pull it towards the solenoid to force engagement of the frictional disks and rotation of the gear 58 in a well understood manner. The non magnetic bushing 74 is provided to avoid loss of magnetic flux and to prevent "sticking" of the armature when the solenoid is de-energized.

It should be noted that the solenoid shell 38 has an overhanging flange 38a which surrounds a substantial portion of the collar 30 so as to transmit flux thereto. There may be smooth bearing engagement between the inner surface of flange 38a and the exterior surface of collar 30. In any event, the air gap therebetween may be reduced to a very small degree so as to minimize magnetic reluctance. Obviously, there is no air gap between the bore 39 in the solenoid and the second sleeve 22. Thus, there is a direct face-to-face magnetic flux transmission between the two bearing surfaces.

Figure 2:
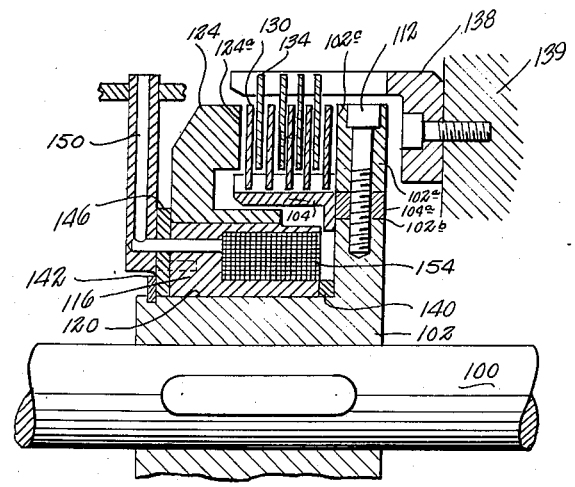

In the form of the invention shown in Fig. 2, a driving shaft 100 has a sleeve 102 keyed thereto. The sleeve carries a non-magnet carrier element 104 and a ring 102a, it being understood that carrier sleeve 104 has a plurality of fingers 104a which protrude into slots such as 102b cut into the sleeve 102, the fingers being angularly spaced and having suitable bores, wherein a p'urality of angularly spaced bolts such as 112 are utilized to hold the sleeves 102, 102a and 104 integral. Carried on the sleeve 102 is a solenoid 116 having rotative bearing engagement at 120 with the sleeve 102. Thus, the solenoid is fixed and remains stationary while shaft 100, together with sleeve 102, sleeve 104 and ring 102a are rotative. Similarly, rotatively carried on the solenoid is an armature 124 which is free to slide axially. Frictional clutch disks such as 130 are splined as shown to the sleeve 104 as shown while co-acting disks such as 134 are splined to a collar 138 bolted to a gear 139 or other rotative device concentric with shaft 100 and having bearing support thereon (not shown).

It will be apparent from the above description that as the solenoid is energized the armature 124 will move to the right as viewed in Fig. 2 since the air gap of the solenoid occurs between the armature face 124a and the inner face 102c of the ring 102a. Inasmuch as the armature is longitudinally slidable it will press the several friction disks to effect rotation of collar 138.

The solenoid may be properly positioned in any well-known manner on the sleeve 102 as by rings 140 and 142 and may be bolted to a ring 146 to which is welded a conduit 150 through which wires may be passed to the solenoid coil 154.

Figure 3:
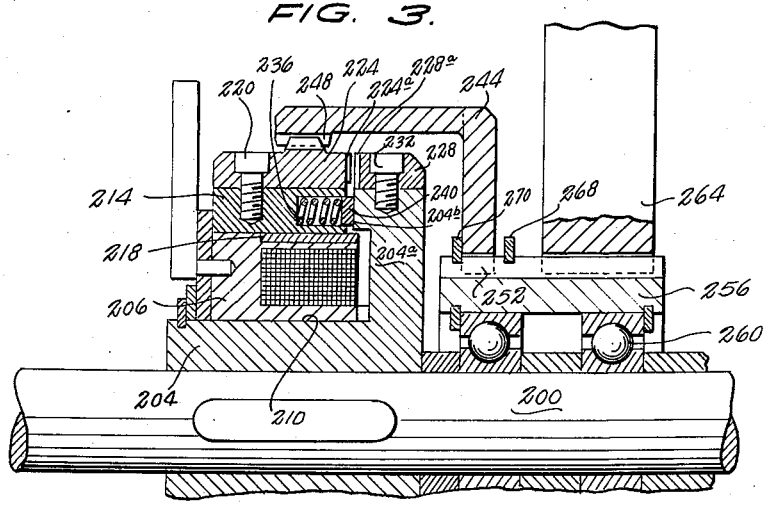

In the form of the invention shown in Fig. 3, a positive engagement type of clutch is disclosed. In this construction, to a driving shaft 200 is keyed a clutch ring 204. A solenoid 206 is carried on the clutch ring and has a rotative relation at the smoothly engaging surface 210. Thus, the ring 204 will rotate with the shaft while the solenoid is held stationary. A ring-like armature sleeve 214 is carried on the solenoid and can rotate with respect therewith on a non-magnetic bronze bushing 218. The armature 214 is bolted as by a series of angular spaced bolts 220 to a claw ring 224 engageable with a claw ring 228 bolted as by a series of angularly spaced bolts 232 to the periphery of an upstanding flange 204a of the ring 204. A series of angularly spaced springs such as 236 suitable socketed within the armature press outwardly against a pressure ring 240 which has rotative engagement with respect to a vertical annular face 204b of flange 204a. Thus, the springs bias the armature away from the ring 204 to disengage the teeth 224a from the teeth 228a. A coupling sleeve 244 has suitable splined engagement at 248 with the armature and is keyed at 252 to a collar 256 carried on a ball bearing 260 on the drive shaft.

A gear 264 is similarly splined to collar 256. The coupling collar 244 has a slidable fit in its splined engagement with collar 256 so that it can have slight axial motion between the limits provided by lock rings 268 and 270. The limited motion afforded to collar 244 with respect to 256 is, of course, to allow for motion of the armature to which collar 244 is secured especially in the event of a tight engagement at the splined portion 248. Thus, there is no obstruction to axial motion of the armature. It will be apparent from the above description that when the solenoid is energized the armature will be attracted to the face 204b which will effect engagement of the teeth of the claw ring to thus cause rotation, through coupling 244, of the gear 264. When such engagement occurs the armature will then, of course, rotate along with the ring 204.

Figure 4:
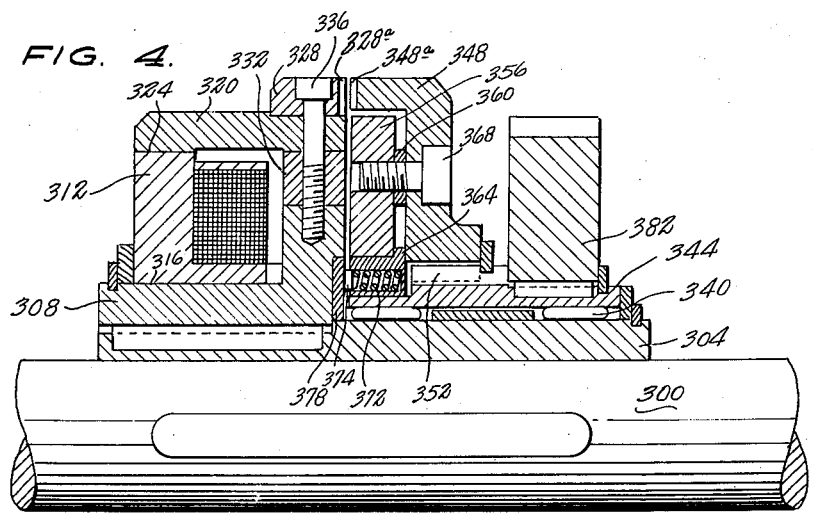

In the form of the invention shown in Fig. 4, a driving shaft 300 has keyed thereto a sleeve 304, to which a magnetic flux carrying sleeve 308 is keyed. The sleeve 308 carries a non-rotative solenoid magnet 312 on a suitably smooth bearing surface 316. A sleeve 320 of magnetic material is bolted intermediate a non-magnetic claw ring 328 and a non-magnetic ring 332, to the sleeve 308 as by bolts 336 which will be understood to be in angularly spaced array. The sleeve 320 has a rotative fit at the surface 324.

Also carried on sleeve 304 as by roller bearings 340 is a sleeve 344 to which claw ring 348 is slidably splined at 352. Bolted to the claw ring 348 is an armature 356 which armature is magnetically isolated from the claw ring 348 and the sleeve 344 by means of a ring 360 and a bushing 364 which are of non-magnetic material. Thus, the bolts 368 may likewise be of non-magnetic material and pass through suitably provided holes in the non-magnetic ring 360 to hold the armature to the claw ring 348. A plurality of angularly spaced springs such as 372 are socketed in the bushing 364 each bearing against a disk 374 which disks bear against a pressure plate 378.

Preferably the claw 348 is of non-magnetic material so that there will be no "sticking" between the claw rings when the solenoid is de-energized.

The construction just described provides for a short, overall length of the claw ring 348 which serves to couple the driving shaft to the driven gear 382.

In the above description when the solenoid is energized the flux is directed from the sleeve 320 into the armature 356 because of the non-magnetic ring 332. Thus, it travels through the armature and passes into sleeve 308 to attract the armature against the bias of the springs 372 to thereby engage the teeth 348a and 328a. It will be apparent that when the clutch is de-energized the sleeve 320 is rotative along with the sleeve 308. The armature is, however, not rotative at this time. When the solenoid is energized rotation is transmitted via the engaging teeth to the claw ring 348 whence rotation of the armature together with sleeve 344 and gear 382 is effected.

Figure 5:
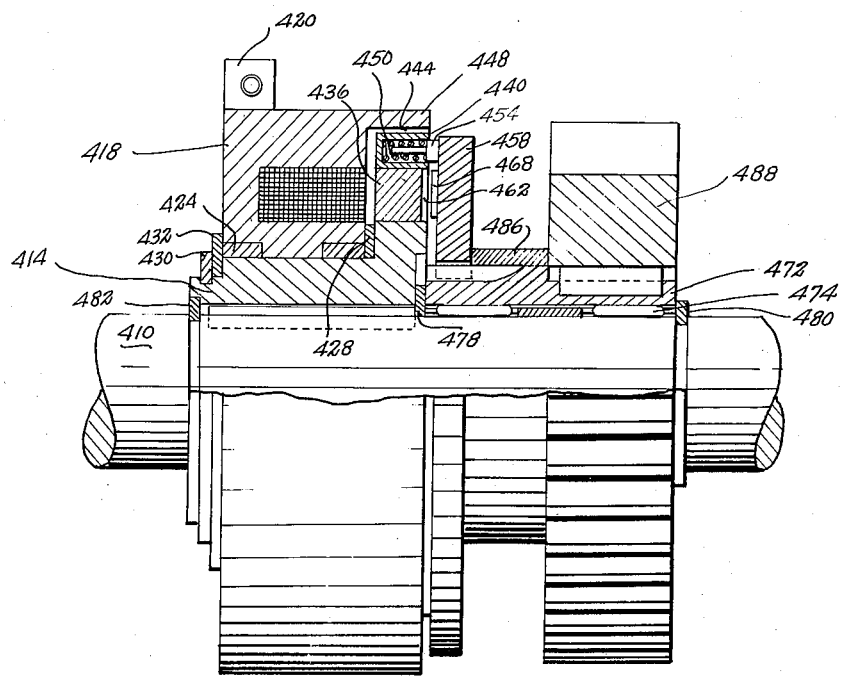

In the form of the invention shown in Fig. 5, a driving shaft 410 has keyed thereto a collar 414 of magnetic material on which collar rides a solenoid magnet body 418 which is stationary provided with a conductor terminal 420. The magnet 418 is mounted by means of suitable bearings such as 424 on the collar 414. A suitable non-magnetic spacer ring 428 is utilized to properly hold the magnet body in position on the collar 414 in conjunction with lock rings 430 and 432.

Carried on the collar 414 is a non-magnetic ring 436 which may be force-fitted thereon, which ring carries a ring 440 of magnetic material having an air gap 444 of very close dimensions with the skirt 448 of the magnet body. The ring 440 is provided with spaced annular sockets for holding respective compression springs 450 that press pins 454 outwardly against an armature 458 to maintain the armature away from the solenoid body.

Preferably the fit between the ring 440 and the skirt 448 should be as close as possible without causing undue angular friction, since it will be apparent that collar 414 is rotated with shaft 410 and accordingly the rings 436 and 440 are likewise rotative.

The ring 436 is provided with clutch teeth 462 for engagement with clutch teeth 468 of the armature 458. Thus, when the solenoid is energized the clutch teeth engage to effect rotation of the armature.

The armature is slidably keyed to a sleeve 472 carried on bearings 474 on shaft 410. A spacer ring 478 maintains sleeve 472 in proper position with respect to collar 414, it being noted that locking rings 480 and 482 on shaft 410 are utilized to maintain the assembly properly on the shaft. A spacer collar 486 is carried on sleeve 472 to limit the de-energized position of armature 458. A driven gear 488 is keyed to sleeve 472.

In the above modification, the flux travels through the magnet body and through collar 414; thence through the armature and through ring 440, air gap 444, back to the magnet body.

It will be noted that the bearings 424 need carry only the weight of the supported parts such as the magnet body and can be self-lubricating bearings of any known kind. This applies also to other above cited bearings such as 39, 120, 210 and 316 (Figs. 1 to 4). It will also be noted that no special clutch rings are required inasmuch as the non-magnetic ring 436 must be present to avoid direct magnetic flux transmission from the peripheral part 440 to the hub of the collar 414. By providing teeth on the non-magnetic ring 436 and on the armature, the number of components required for the clutch is reduced as in prior constructions described herein wherein the magnetic flux takes the form of the concentric cylindrical fields joined through the armature.

We claim:

1. In a device of the class described, a first sleeve connectable to one of a driving or driven member, a magnetic clutching system carried on said first sleeve and comprising a second sleeve of magnetic material, a stationary solenoid magnet mounted on said second sleeve with bearing engagement therebetween, a slidably mounted armature rotatably carried by said first sleeve and rotatable therewith, and clutch elements engageable on attraction of said armature and said solenoid magnet is energized at least a first clutch element of said clutch elements being connected to one of said first or second sleeves, a power transferring means, at least a second clutch element of said clutch elements being connected to said power transferring means, said power transferring means being rotative upon engagement of said clutch elements, and a non-magnetic ring disposed on said second sleeve intermediate said armature and said solenoid magnet for directing the magnetic flux through said armature when said solenoid magnet is energized.

2. A device as set forth in claim 1, including a ring of magnetic material surrounding said non-magnetic ring, said solenoid magnet having a skirt, said magnetic ring being disposed within said skirt and having a close air gap with respect to the interior surface thereof, said ring being rotative with said non-magnetic element and with second said sleeve.

3. A device as set forth in claim 2, said clutch elements comprising a plurality of clutch disks keyed to said first sleeve, and co-acting clutch disks keyed to said power transferring element for engagement with said first-mentioned clutch disks, said armature being disposed to press said disks together upon energization of said solenoid magnet.

4. In a device as set forth in claim 1, wherein said clutch elements comprise a plurality of positively engaging teeth carried by said sleeve and a co-acting plurality of teeth carried by said armature.

5. In a device as set forth in claim 4, including a disk-like component secured to said armature, said component having a skirt, said last-mentioned plurality of teeth being formed on a free edge of said skirt.

6. A device as set forth in claim 5, including a sleeve having rotative bearing support on said shaft, said disklike component being slidably keyed to said sleeve and carrying said armature.

7. A device as set forth in claim 1, said armature comprising a ring rotatively mounted on said solenoid, a bearing of non-magnetic material intermediate said solenoid magnet and said armature for a portion of the lengths thereof, said sleeve comprising a flange having a surface disposed adjacent an edge of said armature for flux transmission thereto.

8. In a device as set forth in claim 1, said ring of non-magnetic material comprising one of said clutch elements and said armature comprising another of said clutch elements wherein the clutch element of said non-magnetic ring is engageable with the clutch element of said armature upon energization of said solenoid.

9. In a device of the class described a shaft and a magnetic system carried on said shaft and comprising a sleeve keyed to said shaft, a stationary solenoid magnet concentrically carried on said sleeve and having bearing engagement thereon, and an armature carried by said sleeve and being movable along said sleeve upon energization of said solenoid magnet, said solenoid magnet being disposed to form two close air gaps within said magnetic system, said air gaps being concentric with the axis of said bearing engagement between said sleeve and said solenoid magnet; said sleeve further carrying friction disks engageable on attraction of said armature when said solenoid magnet is energized, a power take-off means rotative upon engagement of said frictional disks, a non-magnetic carrier element being supported by said sleeve and carrying said friction disks slidably keyed to said non-magnetic element, co-acting friction disks being carried by said power take-off means, and said armature being disposed to press said shaft to said power take-off elements.

10. An electromagnetic clutch; said electromagnetic clutch including a first sleeve adapted to be engageable by one of a driving or driven means; said first sleeve supporting a magnetic structure having a first portion stationarily mounted and a second portion rotatable with said first sleeve; said second portion defining a second sleeve mounted on said first sleeve; a clutching means and an armature means; said armature means being carried by said first sleeve and being axially movable with respect thereto; said clutch means including a first portion connected to said first sleeve to be rotatable therewith and a second portion operatively connectable to the other of said driving or driven member; said armature means being movable with respect to said clutch means to operatively connect said first and second portions of said clutch means responsive to energization of said magnetic structure; said second sleeve extending along said first sleeve for a first portion of the length of said first sleeve; said armature being connected to said first sleeve on a second portion of the length of said first sleeve.

11. An electromagnetic clutch; said electromagnetic clutch including a sleeve adapted to be engageable by one of a driving or driven means; said sleeve supporting a magnetic structure having a first portion stationarily mounted and a second portion rotatable with said sleeve; said second portion defining a concentric member mounted on said sleeve; a clutching means and an armature means; said armature means being carried by said sleeve and being axially movable with respect thereto; said clutch means including a first portion connected to said sleeve to be rotatable therewith and a second portion operatively connectable to the other of said driving or driven member; said armature means being movable with respect to said clutch means to operatively connect said first and second portions of said clutch means responsive to energization of said magnetic structure; said concentric member extending along said sleeve for a first portion of the length of said sleeve; said armature being connected to said sleeve on a second portion of the length of said sleeve.

12. The device of claim 10 where said first and second portions of said clutch means are alternately positioned magnetic disks.

References Cited in the file of this patent

UNITED STATES PATENTS

| | | |
|---|---|---|
| 754,291 | Eastwood | Mar. 8, 1904 |
| 1,622,939 | Bing | Mar. 29, 1927 |
| 2,209,776 | Kiekhaefer | July 30, 1940 |
| 2,217,357 | Coe | Oct. 8, 1940 |
| 2,375,783 | Gilfillan | May 15, 1945 |
| 2,386,402 | Lilja | Oct. 9, 1945 |
| 2,401,003 | Lear | May 28, 1946 |
| 2,430,174 | Hoover | Nov. 4, 1947 |
| 2,492,205 | Warner | Dec. 27, 1949 |
| 2,729,318 | Harter | Jan. 3, 1956 |

FOREIGN PATENTS

| | | |
|---|---|---|
| 398,434 | Great Britain | Sept. 14, 1933 |
| 524,364 | Italy | Apr. 22, 1955 |
| 1,101,812 | France | Apr. 27, 1955 |